United States Patent
Park et al.

(10) Patent No.: US 8,351,732 B2
(45) Date of Patent: Jan. 8, 2013

(54) METHOD AND APPARATUS FOR BIT RESOLUTION ENHANCEMENT AND EDGE ENHANCEMENT IN AN ELECTRONIC DEVICE

(75) Inventors: Min-Kyu Park, Seoul (KR); Seung-Joong Hwang, Seoul (KR); Doo-Hyeon Kim, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 978 days.

(21) Appl. No.: 12/399,512

(22) Filed: Mar. 6, 2009

(65) Prior Publication Data
US 2009/0226112 A1    Sep. 10, 2009

(30) Foreign Application Priority Data
Mar. 6, 2008   (KR) .................. 10-2008-0020992

(51) Int. Cl.
*G06K 9/40*   (2006.01)
(52) U.S. Cl. ............... 382/266; 382/268; 382/299
(58) Field of Classification Search ............ 382/266, 382/268, 299
See application file for complete search history.

(56) References Cited

U.S. PATENT DOCUMENTS

| | | | | |
|---|---|---|---|---|
| 6,055,340 | A * | 4/2000 | Nagao | 382/261 |
| 6,373,992 | B1 * | 4/2002 | Nagao | 382/266 |
| 7,379,624 | B2 * | 5/2008 | Hoshi | 382/299 |
| 7,672,022 | B1 * | 3/2010 | Fan | 358/474 |

FOREIGN PATENT DOCUMENTS

KR   1020060068265   *   6/2006

* cited by examiner

*Primary Examiner* — Jayesh A Patel
(74) *Attorney, Agent, or Firm* — The Farrell Law Firm, P.C.

(57) ABSTRACT

A method and apparatus for bit resolution enhancement and edge enhancement in an electronic device are provided. The method includes determining a Contour Counter (CC) and determining a type of each region of the input image, determining a Bit Resolution Enhancement (BRE) parameter and an edge enhancement parameter of each region according to the determined region type, determining a first weight for each region of the image and enhancing a bit resolution of the input image, and determining a second weight for each region of the image and performing edge enhancement for the image.

18 Claims, 4 Drawing Sheets

| Y1 | Y2 | Y3 | Y4 | Y5 |
|---|---|---|---|---|
| Y6 | Y7 | Y8 | Y9 | Y10 |
| Y11 | Y12 | Y13 | Y14 | Y15 |
| Y16 | Y17 | Y18 | Y19 | Y20 |
| Y21 | Y22 | Y23 | Y24 | Y25 |

FIG.2
(PRIOR ART)

METHOD AND APPARATUS FOR BIT RESOLUTION ENHANCEMENT AND EDGE ENHANCEMENT IN AN ELECTRONIC DEVICE

PRIORITY

This application claims priority under 35 U.S.C. §119(a) to a Korean Patent Application in the Korean Intellectual Property Office on Mar. 6, 2008 and assigned Serial No. 10-2008-0020992, the contents of which are incorporated herein by reference.

BACKGROUND OF THE INVENTION

1. Field of the Invention

The present invention relates generally to a method and apparatus for Bit Resolution Enhancement (BRE) and edge enhancement in an electronic device. The present invention relates particularly to a method and apparatus for enhancing a bit resolution and eliminating a contour noise and simultaneously, enhancing an edge of an image (i.e., a contour) in an electronic device.

2. Description of the Related Art

Typical techniques for enhancing a quality of an image include a Bit Resolution Enhancement (BRE) technique and an edge enhancement technique. The BRE technique eliminates a high frequency component, which is expressed as a contour due to a decrease of the number of bits of an image, using a Low Pass Filter (LPF). The edge enhancement technique enhances a high frequency component of an image.

In general, if the number of bits expressing a one-dimensional signal decreases, a discontinuous point is generated. The discontinuous point appears as an unnecessary high-frequency component. FIGS. 1A and 1B are graphs illustrating one-dimensional signals depending on number of bits. For example, as shown in FIGS. 1A and 1B, a continuous signal expressed at 8 bits appears as a discontinuous signal at 6 bits. In the case of a two dimensional image, the discontinuous signal is expressed as an artifact called a contour. The BRE technique restores a decreased number of bits to the original state in order to eliminate the contour. As above, the contour expressed as the discontinuous signal is eliminated using the LPF. FIG. 2 is a diagram illustrating a general 5×5 mask. For example, a contour can be eliminated by applying an LPF of Equation (1) below to a center pixel value (Y13) in a 5×5 mask of FIG. 3.

$$Y\_out = \sum_{k=0}^{24} Y_k / 25 \quad (1)$$

In Equation (1), '$Y_k$' represents a pixel value of an image corresponding to $Y_k{}^{th}$ of the 5×5 mask, and 'Y_out' represents an output pixel value of an LPF of the 5×5 mask format.

In general, if the BRE technique is applied to an image, a contour noise is not reduced, but a portion of the image corresponding to an edge is affected and flattened. Thus, according to the conventional art, the BRE technique is applied to increase a quality of an image and then, the edge enhancement technique is applied to restore an edge flattened due to the BRE to the original state.

For the edge enhancement, there a variety of methods are provided. Among the provided methods, the most basic method can be expressed in Equation (2) below:

$$\text{output} = Y13 \times 2 - \frac{Y7 + Y8 + Y9 + Y12 + Y14 + Y17 + Y18 + Y19}{8} \quad (2)$$

Equation (2) represents a technique for enhancing an edge by subtracting an average value of pixels around a center pixel (Y13) from double the center pixel value in the 5×5 mask of FIG. 2.

In the conventional art, the BRE technique and edge enhancement technique are independently researched and provided respectively and thus, the edge enhancement technique is separately applied after the BRE. However, a method of applying the two techniques respectively as described requires adding a line memory at the time of hardware implementation and thus, causes a problem of an increased cost.

SUMMARY OF THE INVENTION

The present invention has been made to address at least the above problems and/or disadvantages and to provide at least the advantages described below. Accordingly, one aspect of the present invention provides a method and apparatus for improving a quality of an image in an electronic device.

Another aspect of the present invention is to provide a method and apparatus for Bit Resolution Enhancement (BRE) and edge enhancement in an electronic device.

Another aspect of the present invention is to provide a method and apparatus for eliminating a contour noise and simultaneously enhancing an edge, thus reducing a hardware cost in an electronic device.

The above aspects are achieved by providing a method and apparatus for bit resolution enhancement and edge enhancement in an electronic device.

According to one aspect of the present invention, a method for contour noise elimination and edge enhancement in an electronic device is provided. The method includes determining a Contour Counter (CC) representing a flat degree of each region in an input image and determining a type of each region of the input image, determining a Bit Resolution Enhancement (BRE) parameter and an edge enhancement parameter according to the determined region type, determining a first weight for each region of the input image on a basis of the BRE parameter and enhancing a bit resolution of the input image, and determining a second weight for each region of the input image on a basis of the edge enhancement parameter and performing edge enhancement for the bit-resolution-enhanced image.

According to another aspect of the present invention, an apparatus for contour noise elimination and edge enhancement in an electronic device is provided. The apparatus includes a region determiner, a BRE application unit, and an edge enhancement unit. The region determiner determines a CC representing a flat degree of each region of an input image, determines a type of each region, and determines a BRE parameter and an edge enhancement parameter according to the determined region type. The BRE application unit determines a first weight for each region of the input image on a basis of the BRE parameter and enhances a bit resolution of the input image. The edge enhancement unit determines a second weight for each region of the input image on a basis of the edge enhancement parameter and performs edge enhancement for the bit-resolution-enhanced image.

BRIEF DESCRIPTION OF THE DRAWINGS

The above and other aspects, features and advantages of the present invention will become more apparent from the following detailed description when taken in conjunction with the accompanying drawings in which:

FIG. 2 is a diagram illustrating a general 5×5 mask;

DETAILED DESCRIPTION OF THE PREFERRED EMBODIMENTS

Figure 1A:
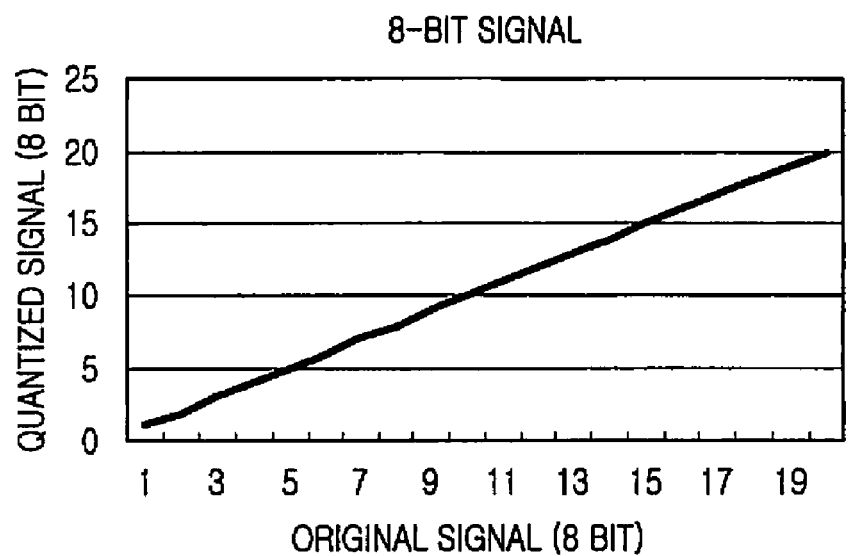
FIGS. 1A and 1B are graphs illustrating one-dimensional signals depending on number of bits.
Figure 1B:
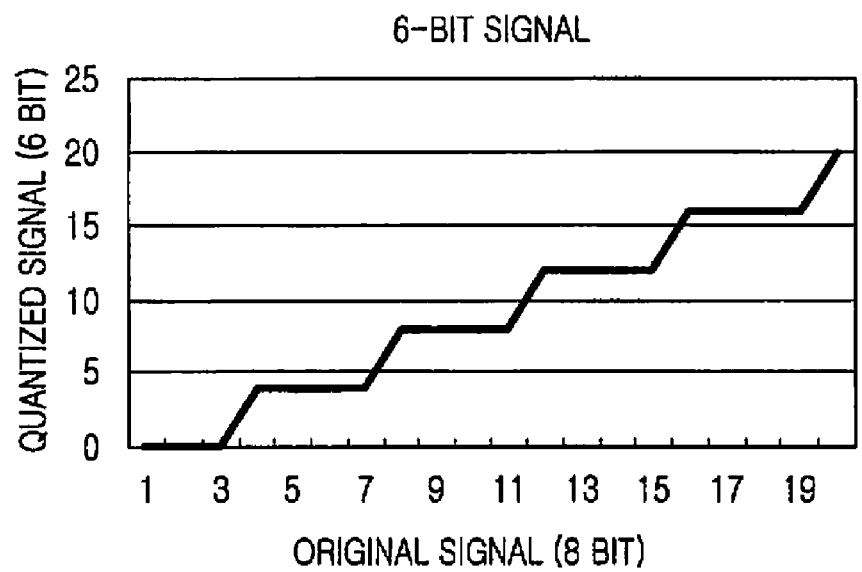

Preferred embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

A technique for determining whether each region of an input image belongs to any of a flat region, a contour region, and an edge region, thus enhancing a bit resolution while enhancing an edge in an electronic device according to an embodiment of the present invention is described below.

Figure 3:
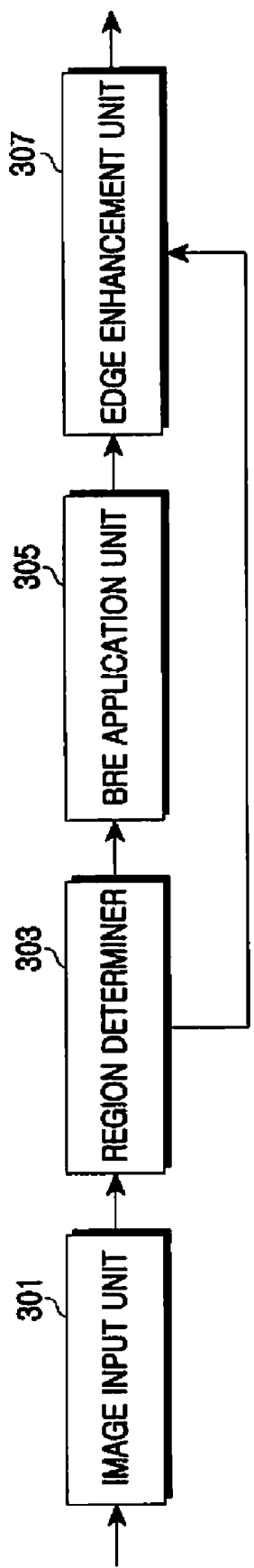
FIG. 3 is a block diagram illustrating a construction of an electronic device according to an embodiment of the present invention.

FIG. 3 is a block diagram illustrating a construction of an electronic device according to an embodiment of the present invention.

Referring to FIG. 3, the electronic device includes an image input unit 301, a region determiner 303, a BRE application unit 305, and an edge enhancement unit 307.

The image input unit 301 receives an image having a decreased number of bits and provides the image to the region determiner 303.

The region determiner 303 receives the image having the decreased number of bits from the image input unit 301, calculates a Contour Counter (CC) value, determines whether a corresponding region is a flat region, a contour region, or an edge region, and sets a parameter for applying a BRE technique and edge enhancement technique depending on the determined region result. The CC value is obtained by comparing an absolute value of a difference between a center pixel and a peripheral pixel, with a bit depth (bit_depth) value. The bit depth (bit_depth) represents a value difference between discontinuous points generated due to the decreased number of bits. For example, a decrease of 8 bits to 6 bits is a decrease of as much as 2 bits. Accordingly, the bit depth is defined as '4', which is a square of '2', i.e, '$2^2$'. A decrease of 8 bits to 4 bits is a decrease of as much as 4 bits and thus, the bit depth is defined as '16', which is the fourth power of '2', i.e, '$2^4$'.

More specifically, the region determiner 303 calculates the count only if the absolute value of the difference between the center pixel and the peripheral pixel is less than or equal to the bit depth as given in Equation (3) below, and increases the CC by one as in Table 1 below.

TABLE 1

```
CC = 0;
for (k = 1; k < 26; k++){
    if(|Y_13 - Y_k| ≦ bit_depth){
        CC++;
    }
}
```

Equation given in Table 1 is described in Equation (3) below.

Equation (3) represents a conditional expression for calculating a CC using a 5×5 mask.

$$|Y_{13} - Y_k| \leq \text{bit\_depth} \tag{3}$$

In Equation (3), the '$Y_{13}$' represents a center pixel value in the 5×5 mask, and the '$Y_k$' is a peripheral pixel value where 'k' can be a value between '1' and '25'. Here, the region determiner 303 shifts a specific mask by a predetermined value in a row direction and column direction while calculating CC values for all regions of the input image.

As the CC value decreases, a corresponding region is closer to an edge region. As the CC value increases, a corresponding region is closer to a flat region. Thus, as shown in Table 2 below, the region determiner 303 classifies each region of an image into one of the edge region, the flat region, and a contour region according to the calculated CC value, and sets the parameter for applying the BRE technique and edge enhancement technique, to the classified region.

Table 2 below shows regions determined and parameters set depending on CC values.

TABLE 2

| CC size | Region | Parameter |
| --- | --- | --- |
| CC > N80 | Flat | $P_{EE} = 0, BD_{BRE} = 1, MS_{BRE} = 3$ |
| N80 ≧ CC > N40 | Contour | $P_{EE} = 1, BD_{BRE} = 2, MS_{BRE} = 5$ |
| N40 ≧ CC > N30 | Contour | $P_{EE} = 2, BD_{BRE} = 2, MS_{BRE} = 5$ |
| N30 ≧ CC > N25 | Contour | $P_{EE} = 3, BD_{BRE} = 2, MS_{BRE} = 5$ |
| N25 ≧ CC | Edge | $P_{EE} = 4, BD_{BRE} = 1, MS_{BRE} = 3$ |

In Table 2, the 'CC' represents a CC value, and the 'N**' is a numerical value representing the percentage (%) of a mask. For example, in the case of a 5×5 mask, the 'N80' is equal to 20 (5×5×80/100) corresponding to 80% of the 5×5 mask, and the 'N25' is equal to 6.25 (5×5×25/100) corresponding to 25% of the 5×5 mask. The '$P_{EE}$' is a weight decision parameter for edge enhancement technique. The '$BD_{BRE}$' and '$MS_{BRE}$' represent a weight decision parameter and mask size for BRE technique. A value of each parameter depending on the CC value is previously given through experiment.

The BRE application unit 305 decides a weight necessary for BRE technique using the parameter set in the region determiner 303, and enhances a bit resolution of an input image using the decided weight.

The BRE application unit 305 decides a weight for each pixel of the input image using the weight decision parameter ($BD_{BRE}$) and mask size ($MS_{BRE}$) for BRE technique, sums up the weight for each pixel. More specifically, the BRE application unit 305 determines whether a corresponding region is a contour region through the weight decision parameter ($BD_{BRE}$) for BRE technique. The BRE application unit 305 compares an absolute value of a difference between a center pixel within a mask having the mask size ($MS_{BRE}$) and a specific peripheral pixel, with the bit depth, and decides a weight for the specific peripheral pixel. After deciding the weights of all of the pixels of the image, the BRE application unit 305 sums up the weights of all of the pixels, thus calculating a weight sum.

That is, the BRE application unit 305 decides a weight of each pixel for BRE technique and a weight sum using a method shown in Table 3 below.

TABLE 3

```
weight_sum = 0;
for(i = r-MS_bre; i < r+1+MS_bre; i++){for(j = c-MS_bre; j < c+1+MS_bre; j++){
    if(BD_bre == 2){
        if(|in[r][c] - in[i][j]| ≦ bit_depth)
            {weight[i][j] = 2;}
```

TABLE 3-continued

```
    else if(|in[r][c] - in[i][j]| ≦ bit_depth × BD_bre)
        {weight[i][j] = 1;}
    else
        {weight[i][j] = 0 }
    }
    if(BD_bre == 1){
        if(|in[r][c] - in[i][j]| ≦bit_depth)
            {weight[i][j] = 1;}
        else
            {weight[i][j] = 0}
    }
    weight_sum = weight_sum + weight[i][j]
}}
```

In Table 3, 'in[r][c]' represents a pixel value corresponding to a $c^{th}$ column of an $r^{th}$ row in an input image. Also, 'in[i][j]' represents a pixel value corresponding to a $j^{th}$ column of an $i^{th}$ row in the input image. Furthermore, 'weight[i][j]' represents a weight for a pixel corresponding to the $j^{th}$ column of the $i^{th}$ row in the input image. Finally, 'weight_sum' represents a weight sum for all pixels.

Referring to Table 3, the BRE application unit 305 determines whether a corresponding region is a contour region, a flat region, or an edge region through the weight decision parameter ($BD_{BRE}$) for BRE technique. The BRE application unit 305 compares an absolute value of a difference between a center pixel within a mask having a mask size ($MS_{BRE}$) and a specific peripheral pixel, with the bit depth. The BRE application unit 305 sets a weight to each of the pixels around the center pixel according to the determined region type and the comparison result.

After the weight of each pixel decided for BRE technique and the weight sum are decided, as shown in Table 4 below, the BRE application unit 305 applies the mask having the mask size ($MS_{BRE}$) to an input image and multiplies each pixel value within the mask by the weight corresponding to each pixel. Next, the BRE application unit 305 sums up the multiplication result values, divides the summation result by the weight sum, and outputs the divided result as a result value for the center pixel within the mask.

Table 4 below represents a BRE method.

TABLE 4

```
for(r = 0; r < row; r++){for(c = 0; c < column; c++){
    bre_out[r][c] = 0;
    for(i = r-MS_bre; i < r+1+MS_bre; i++){for(j = c-MS_bre; j < c+1+MS_bre; j++){
        bre_out[r][c]+= in[i][j] × weight[i][j];
    }}
    bre_out[r][c] = bre_out[r][c] / weight_sum;
}}
```

In Table 4, 'in[i][j]' represents a pixel value corresponding to a $j^{th}$ column of an $i^{th}$ row in the input image, 'weight[i][j]' represents a weight for a pixel corresponding to the $j^{th}$ column of the $i^{th}$ row in the input image. In addition, 'weight_sum' represents a weight sum for all pixels, and 'bre_out[r][c]' represents a BRE result value of the center pixel of the mask used in BRE technique.

After an operation of the BRE application is completed, the BRE application unit 305 provides the BRE application result to the edge enhancement unit 307.

After performing the edge enhancement of Equation (4) below using the BRE application result provided from the BRE application unit 305, the edge enhancement unit 307 decides an edge enhancement weight using the weight decision parameter ($P_{EE}$) for edge enhancement and the BRE application result. Then, the edge enhancement unit 307 multiplies the BRE application result by the edge enhancement weight, and outputs the final multiplication result.

Equation (4) below represents an edge enhancement method.

$$ee\_out = bre\_out \times 2 - \frac{1}{64}(Y1 + Y5 + Y21 + Y25) - \qquad (4)$$
$$\frac{2}{64}(Y2 + Y4 + Y6 + Y10 + Y16 + Y20 + Y22 + Y24) -$$
$$\frac{3}{64}(Y3 + Y7 + Y9 + Y11 + Y15 + Y17 + Y19 + Y23) -$$
$$\frac{5}{64}(Y8 + Y12 + Y14 + Y18)$$

In Equation (4), 'ee_out' represents an edge enhancement result, and 'bre_out' represents a BRE application result provided from the BRE application unit 305. 'Yk(k=1, 2, 3, . . . , 25)' represents values of pixels around a pixel intending for edge enhancement (i.e., a center pixel), and '1/64', '2/64', '3/64', and '5/64' represent weights for corresponding peripheral pixels. Greater weights are applied to peripheral pixels closer to the center pixel. The above weights are only for example, and different values may be applied according to the present invention.

Next, the edge enhancement unit 307 decides the edge enhancement weight using the edge enhancement result, the weight decision parameter ($P_{EE}$) for edge enhancement, and the BRE application result. In detail, the edge enhancement unit 307 divides the edge enhancement result by the BRE application result as in Equation (5) below, thus deciding an edge enhancement weight.

$$weight\_EE[r][c] = ee\_out[r][c]/bre\_out[r][c] \qquad (5)$$

In Equation (5), 'weight_EE[r][c]' represents a weight for a pixel corresponding to a $c^{th}$ column of an $r^{th}$ row in an image, while 'ee_out[r][c]' represents an edge enhancement result value of the pixel corresponding to the $c^{th}$ column of the $r^{th}$ row in the image. In addition, 'bre_out[r][c]' represents a BRE application result value of the pixel corresponding to the $c^{th}$ column of the $r^{th}$ row in the image.

Then, the edge enhancement unit 307 decides bounds of an edge enhancement weight using the weight decision parameter ($P_{EE}$) for edge enhancement in Equation (6) below, and determines whether the edge enhancement weight acquired through Equation (5) is included within the decided bounds.

$$low\_bound = 1 - P_{EE}/16$$
$$high\_bound = 1 - P_{EE}/32 \qquad (6)$$

In Equation (6), 'low_bound' and 'high_bound' represent the minimum value and maximum value, respectively, of the edge enhancement weight.

The edge enhancement unit 307 determines whether the acquired edge enhancement weight is included within the decided bounds. If the acquired edge enhancement weight is included within the bounds, the edge enhancement unit 307 keeps the acquired edge enhancement weight. If the acquired edge enhancement weight is not included within the bounds, the edge enhancement unit 307 changes the acquired edge enhancement weight into a value included within the bounds, i.e., if the acquired edge enhancement weight is less than 'low_bound' that is the minimum value of the bounds, the edge enhancement unit 307 changes the edge enhancement weight into 'low_bound'. However, if the acquired edge enhancement weight is greater than 'high_bound' that is the maximum value of the bounds, the edge enhancement unit 307 changes the edge enhancement weight into 'high_bound'.

Then, the edge enhancement unit 307 multiplies the BRE application result provided from the BRE application unit 305 by the edge enhancement weight, and outputs the final result of execution of edge enhancement as given in Equation (7) below:

$$\text{output}[r][c] = \text{weight\_EE}[r][c] \times \text{bre\_out}[r][c] \quad (7)$$

In Equation (7), 'output[r][c]' represents a final result value of a pixel corresponding to a $c^{th}$ column of an $r^{th}$ row in an image, and 'weight_EE[r][c]' represents a weight for the pixel corresponding to the $c^{th}$ column of the $r^{th}$ row in the image. Also, 'bre_out[r][c]' represents a BRE application result value of the pixel corresponding to the $c^{th}$ column of the $r^{th}$ row in the image.

In a flat region or contour region, weak edge enhancement is performed when the bounds of the edge enhancement weight are relatively small. In an edge region, strong edge enhancement is performed when the bounds of the edge enhancement weight are relatively large.

Figure 4:
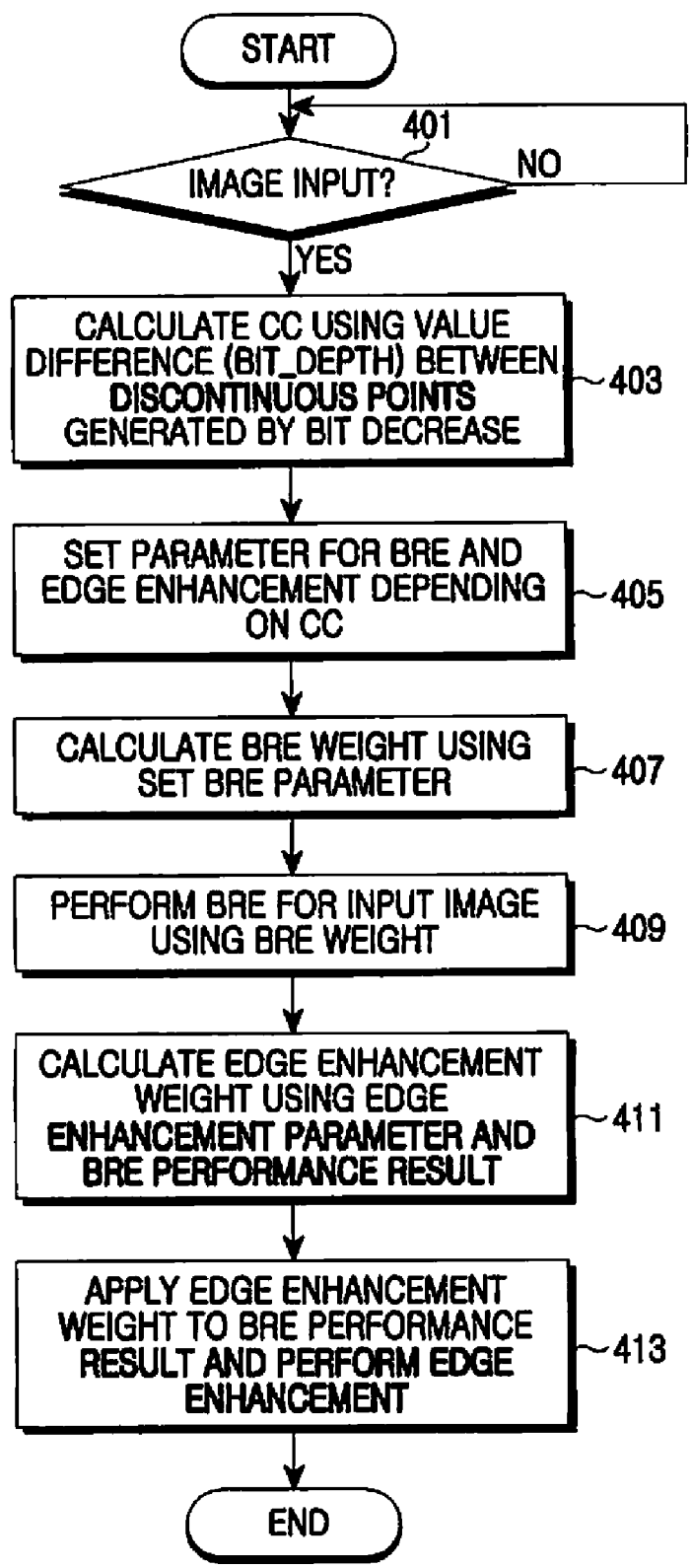
FIG. 4 is a flow diagram illustrating an operation process of enhancing a bit resolution while enhancing an edge in an electronic device according to an embodiment of the present invention.

FIG. 4 is a flow diagram illustrating an operation process of enhancing a bit resolution while enhancing an edge in an electronic device according to an embodiment of the present invention.

Referring to FIG. 4, if an image having a decreased number of bits is input in step 401, the electronic device proceeds to step 403 and calculates a CC of the input image using a bit depth (bit_depth) that represents a value difference between discontinuous points generated by the decrease of the number of bits of the input image, i.e., the electronic device calculates the count only if an absolute value of a difference between a center pixel and a specific peripheral pixel is less than or equal to the bit depth as in Equation (3), and calculates the CC.

In step 405, the electronic device determines whether a corresponding region is a flat region, a contour region, or an edge region depending on the CC value, and sets a parameter for applying a BRE technique and edge enhancement technique depending on the determined region result, i.e., as shown in Table 2, the electronic device classifies each region of an image into an edge region, a flat region, and a contour region depending on the calculated CC value, and sets the parameter for applying the BRE technique and edge enhancement technique, to the classified region. The set parameter is the weight decision parameter ($BD_{BRE}$) and mask size ($MS_{BRE}$) for BRE technique and the weight decision parameter ($P_{EE}$) for edge enhancement technique.

In step 407, the electronic device calculates a weight necessary for the BRE technique using the set parameter, i.e., the electronic device determines whether a corresponding region is a contour region through the weight decision parameter ($BD_{BRE}$) for the BRE technique, compares an absolute value of a difference between a center pixel within a mask having the mask size ($MS_{BRE}$) and a specific peripheral pixel with the bit depth, decides a weight for the specific peripheral pixel, performs this for all pixels of an image, sums up weights for all the pixels, and calculates a weight sum.

In step 409, as shown in Table 4, the electronic device enhances a bit resolution of an input image using the calculated weight, i.e., the electronic device applies the mask having the mask size ($MS_{BRE}$) to the input image, multiplies each pixel value within the mask by a weight corresponding to the each pixel, sums up the result values, divides the summation result by the weight sum, and outputs the divided result as a BRE result value for the center pixel within the mask.

In step 411, the electronic device performs the edge enhancement of Equation (4) using the edge enhancement parameter and the BRE result value. Then, according to Equation (5), the electronic device decides an edge enhancement weight using its result, the weight decision parameter ($P_{EE}$) for edge enhancement, and the BRE result. At this time, the electronic device decides bounds of an edge enhancement weight using the weight decision parameter ($P_{EE}$) for edge enhancement as in Equation (6), determines whether the decided edge enhancement weight is included within the bounds and, if the edge enhancement weight is not included within the bounds, changes the edge enhancement weight such that the changed edge enhancement weight is included within the bounds. To decide the bounds of the edge enhancement weight using the weight decision parameter ($P_{EE}$) for edge enhancement is to set the bounds of the edge enhancement weight small when a corresponding region is a flat region or contour region and set the bounds of the edge enhancement weight large when the corresponding region is an edge region, thus performing strong edge enhancement only for the region determined as being the edge region.

In step 413, the electronic device multiplies the BRE result value by the edge enhancement weight, outputs the final result having an enhanced bit resolution and enhanced edge, and terminates the process according to an embodiment of the present invention.

An embodiment of the present invention has an effect of being able to improve a quality of an image and save hardware cost, by enhancing a bit resolution and eliminating a CC while simultaneously enhancing an edge.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for contour noise elimination and edge enhancement in an electronic device, the method comprising:
    determining a Contour Counter (CC) representing a flat degree of each region of an input image and determining a type of each region of the input image according to the determined CC;
    determining a Bit Resolution Enhancement (BRE) parameter and an edge enhancement parameter of each region according to the determined region type;
    determining a first weight for each region of the input image based on the determined BRE parameter and enhancing a bit resolution of the input image based on the determined first weight to generate a bit-resolution-enhanced image; and
    determining a second weight for each region of the input image based on the determined edge enhancement parameter and performing the edge enhancement for the bit-resolution-enhanced image based on the determined second weight.

2. The method of claim 1, wherein the CC is determined by calculating a count only if an absolute value of a difference between a center pixel and a peripheral pixel in a mask of a predetermined size applied to the input image is less than or equal to a bit depth.

3. The method of claim 1, wherein determining the type of each region comprises comparing the CC with a preset reference value and determining the each region as any one of a flat region, a contour region, and an edge region.

4. The method of claim 1, wherein the BRE parameter and the edge enhancement parameter are determined with reference to a table representing the determined region type according to a CC value, the BRE parameter, and the edge enhancement parameter.

5. The method of claim 1, wherein determining the first weight based on the determined BRE parameter comprises:
identifying a weight decision parameter and a mask size from the determined BRE parameter;
determining a type of a corresponding region using the weight decision parameter;
comparing an absolute value of a difference between a center pixel within a mask having the mask size and a peripheral pixel, with a bit depth; and
determining a first weight for each pixel around the center pixel according to the region type and a result of the comparison.

6. The method of claim 1, wherein enhancing the bit resolution of the input image based on the determined first weight comprises:
multiplying each pixel value of the input image by the first weight corresponding to each pixel; and
dividing a result of the multiplication by a weight sum that is a sum of the first weight of all of the pixels.

7. The method of claim 1, wherein determining the second weight based on the determined edge enhancement parameter comprises:
performing the edge enhancement using the determined edge enhancement parameter and a result of the bit resolution enhancement; and
dividing a result of the edge enhancement by the bit resolution enhancement result and determining the second weight.

8. The method of claim 7, further comprising:
determining bounds of the second weight using the determined edge enhancement parameter;
determining whether the determined second weight is included within the bounds; and
if the second weight is not included within the bounds, changing the second weight into a minimum value or a maximum value of the bounds.

9. The method of claim 1, wherein the edge enhancement is performed by multiplying the bit-resolution-enhanced image by the second weight.

10. An apparatus for contour noise elimination and edge enhancement in an electronic device, the apparatus comprising:
a region determiner for determining a Contour Counter (CC) representing a flat degree of each region of an input image according to the determined CC, determining a type of each region, and determining a Bit Resolution Enhancement (BRE) parameter and an edge enhancement parameter of each region according to the determined region type;
a BRE application unit for determining a first weight for each region of the input image based on the determined BRE parameter and enhancing a bit resolution of the input image based on the determined first weight to generate a bit-resolution-enhanced image; and
an edge enhancement unit for determining a second weight for each region of the input image based on the determined edge enhancement parameter and performing the edge enhancement for the bit-resolution-enhanced image based on the determined second weight.

11. The apparatus of claim 10, wherein the region determiner determines the CC by calculating a count only if an absolute value of a difference between a center pixel and a peripheral pixel in a mask of a predetermined size applied to the input image is less than or equal to a bit depth.

12. The apparatus of claim 10, wherein the region determiner compares the CC with a preset reference value and determines the each region as any one of a flat region, a contour region, and an edge region.

13. The apparatus of claim 10, wherein the region determiner determines the BRE parameter and the edge enhancement parameter with reference to a table representing the determined region type according to a CC value and the BRE parameter and the edge enhancement parameter.

14. The apparatus of claim 10, wherein the BRE application unit identifies a weight decision parameter and a mask size from the determined BRE parameter, determines a type of a corresponding region using the weight decision parameter, compares an absolute value of a difference between a center pixel within a mask having the mask size and a peripheral pixel, with a bit depth, and determines a first weight for each pixel around the center pixel according to the region type and a result of the comparison.

15. The apparatus of claim 10, wherein the BRE application unit multiplies each pixel value of the input image by the first weight corresponding to each pixel, divides a result of the multiplication by a weight sum that is a sum of the first weight of all of the pixels, and enhances a bit resolution.

16. The apparatus of claim 10, wherein the edge enhancement unit performs the edge enhancement using the determined edge enhancement parameter and a result of the bit resolution enhancement, divides a result of the edge enhancement by the bit resolution enhancement result, and determines the second weight.

17. The apparatus of claim 16, wherein the edge enhancement unit determines bounds of the second weight using the determined edge enhancement parameter and, if the determined second weight is not included within the bounds, changes the second weight into a minimum value or a maximum value of the bounds.

18. The apparatus of claim 10, wherein the edge enhancement unit performs the edge enhancement by multiplying the bit-resolution-enhanced image by the second weight.

* * * * *